(12) United States Patent
Frandsen

(10) Patent No.: US 9,903,346 B2
(45) Date of Patent: Feb. 27, 2018

(54) COATED COMPONENT OF A WIND TURBINE

(71) Applicant: SIEMENS AKTIENGESELLSCHAFT, München (DE)

(72) Inventor: Rasmus Berg Frandsen, Langå (DK)

(73) Assignee: SIEMENS AKTIENGESELLSCHAFT (DE)

( * ) Notice: Subject to any disclaimer, the term of this patent is extended or adjusted under 35 U.S.C. 154(b) by 555 days.

(21) Appl. No.: 14/569,925

(22) Filed: Dec. 15, 2014

(65) Prior Publication Data
US 2015/0211495 A1 Jul. 30, 2015

(30) Foreign Application Priority Data
Jan. 28, 2014 (EP) .................................. 14152888

(51) Int. Cl.
*B32B 15/00* (2006.01)
*F03D 11/00* (2006.01)
*C23C 30/00* (2006.01)
*F16C 33/32* (2006.01)
*F16C 33/62* (2006.01)
(Continued)

(52) U.S. Cl.
CPC .......... *F03D 11/0008* (2013.01); *C23C 30/00* (2013.01); *F03D 80/70* (2016.05); *F16C 33/30* (2013.01); *F16C 33/32* (2013.01); *F16C 33/62* (2013.01); *F16N 15/00* (2013.01); *F05B 2230/31* (2013.01); *F05B 2260/98* (2013.01); *F05B 2280/10* (2013.01); *F05B 2280/50* (2013.01); *F16C 2300/14* (2013.01); *F16C 2360/31* (2013.01); *Y02E 10/722* (2013.01); *Y02P 70/523* (2015.11);
(Continued)

(58) Field of Classification Search
None
See application file for complete search history.

(56) References Cited

U.S. PATENT DOCUMENTS 2,834,738 A 5/1958 Vincent
2004/0079310 A1 4/2004 Suzuki
(Continued)

FOREIGN PATENT DOCUMENTS

CN 1497194 A 5/2004
DE 102009012091 A1 3/2010
(Continued)

OTHER PUBLICATIONS

Yamawaki M. et al., "Effect of surface impurities on the hydrogen recombination coefficient of first-wall materials", Journal of Nuclear Materials 162-164, 1989, pp. 1071-1076; 1989.
(Continued)

*Primary Examiner* — Daniel J Schleis
(74) *Attorney, Agent, or Firm* — Schmeiser Olsen & Watts LLP

(57) ABSTRACT

A component with a coating, wherein the component is a part of a wind turbine, the component is in contact with a lubricant and the lubricant comprises atomic hydrogen, is provided. The coating at least partly covers a surface of the component. The coating reduces diffusion of the atomic hydrogen into the component by a means of inducing a recombination of the atomic hydrogen to hydrogen gas. A method of reducing diffusion of atomic hydrogen into a component of a wind turbine by using such a coating is also provided.

12 Claims, 1 Drawing Sheet

(51) Int. Cl.
*F16C 33/30* (2006.01)
*F03D 80/70* (2016.01)
*F16N 15/00* (2006.01)

(52) U.S. Cl.
CPC ............... *Y10T 428/12937* (2015.01); *Y10T 428/12986* (2015.01); *Y10T 428/265* (2015.01); *Y10T 428/31678* (2015.04)

(56) References Cited

U.S. PATENT DOCUMENTS

| | | |
|---|---|---|
| 2010/0133851 A1 | 6/2010 | Devitt |
| 2013/0089283 A1 | 4/2013 | Trojahn |
| 2013/0170777 A1 | 7/2013 | Ito |

FOREIGN PATENT DOCUMENTS

| | | |
|---|---|---|
| DE | 102009023818 A1 | 12/2010 |
| DE | 102011006296 A1 | 10/2012 |
| EP | 2617803 A1 | 7/2013 |
| GB | 994404 A | 6/1965 |
| JP | 5808134 B2 | 11/2015 |
| WO | WO 2009065515 A2 | 5/2009 |
| WO | WO 2013084800 A1 | 6/2013 |
| WO | WO 2014190984 a1 | 12/2014 |

OTHER PUBLICATIONS

Mozetic Miran et al., "Recombination of neutral hydrogen atoms on AISI 304 stainless steel surface", Applied Surface Science 144-145, Elsevier, 1999, pp. 399-403; 1999.
Michael N. Kotzalas et al.:"Tribological advancements for reliable wind turbine performance"; in: Thin Solid Films; vol. 38; No. 1929; pp. 883-4850; ISSN: 0040-6090; DOI 10.1098/rsta.2010.0194; XP055122481; Oct. 28, 2010.
European Extended Search Report; Application No. 14152888.5; 7 pgs.
Communication Under Rule 71—Intention to Grant dated Sep. 7, 2015—Application No. 14 152 888.5; 16 pgs.
Wikipedia: "Raney nickel"; abgerufen am Sep. 15, 2017; pp. 1-5.
Hofmann Hansgeorg et al: "Verfahren der Oberflächentechnik: Grundlagen—Vorbehandlung—Beschichtung—Oberflächenreaktionen—Prüfung"; Fachbuchverlag Leipzig im Carl Hanser Verlag; ISBN 3-446-22228-6; 2004.

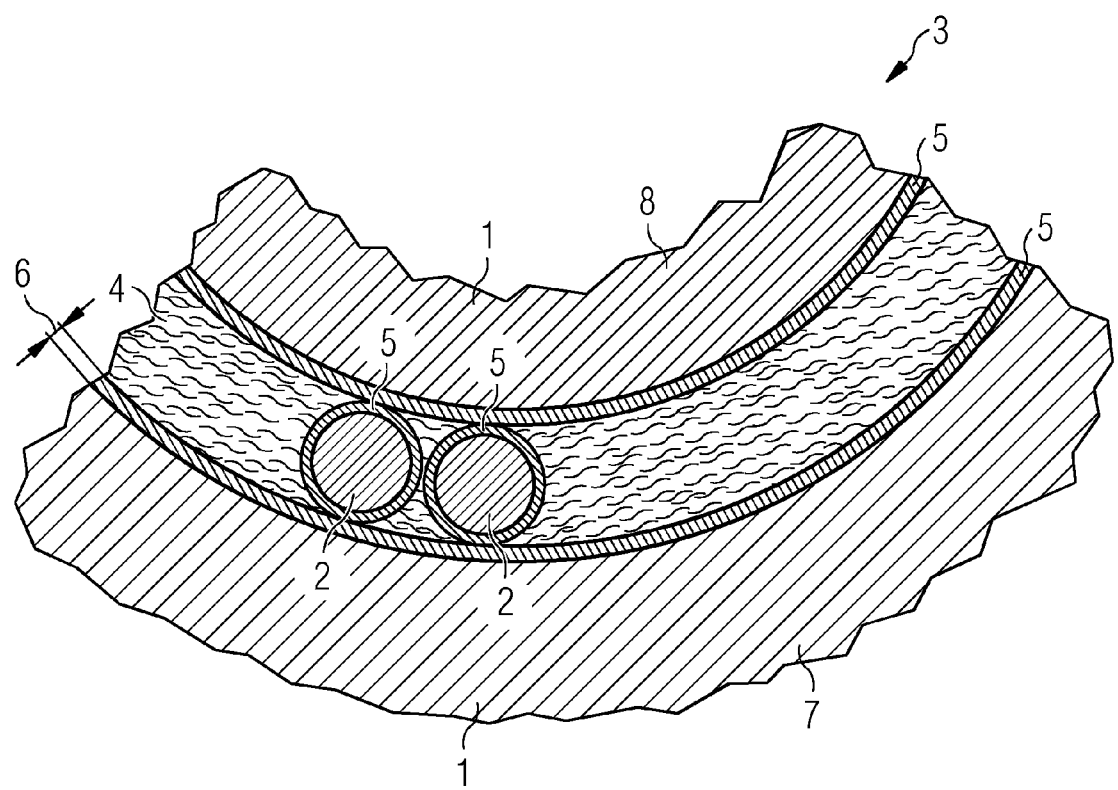

COATED COMPONENT OF A WIND TURBINE

CROSS-REFERENCE TO RELATED APPLICATION

This application claims priority to EP 14152888.5, having a filing date of Jan. 28, 2014, the entire contents of which are hereby incorporated by reference.

FIELD OF TECHNOLOGY

The following relates to a component which is a part of a wind turbine. The component is in contact with a lubricant and suffers from the contact with the lubricant. The following furthermore relates to a method of reducing diffusion of atomic hydrogen into the component of the wind turbine.

BACKGROUND

Bearings in wind turbines often suffer from brittle flaking which results in premature failure of the bearings. This may result in an expensive exchange of parts of the bearings or the bearing as a whole. Brittle flaking is believed to be caused by a combination of rolling fatigue loads and the presence of diffusible hydrogen. The hydrogen is released from used lubricant when the service conditions result in a decomposition of the lubricant. The service conditions which decompose the lubricant can be caused by currents running through the bearing. Furthermore, the decomposition of the lubricant can be caused by tribo-chemical, tribo-mechanical and tribo-physical conditions under severe loading.

An aspect is to provide a way to avoid, or at least to reduce atomic hydrogen to diffuse into a component of a wind turbine.

SUMMARY

An aspect relates to a component with a coating, wherein the component is a part of a wind turbine, the component is in contact with a lubricant and the lubricant comprises atomic hydrogen. The coating covers at least partly the surface of the component. The coating reduces diffusion of the atomic hydrogen into the component by means of inducing a recombination of the atomic hydrogen to hydrogen gas.

In the context of this application, a wind turbine is a device that can convert wind energy, i.e. kinetic energy from wind, into mechanical energy. Advantageously, the mechanical energy is subsequently used to generate electricity. A wind turbine is also referred to as a wind power plant.

A wind turbine comprises a tower, a nacelle, a generator, a rotor, a hub, and rotor blades. The nacelle is arranged rotatable via a yaw bearing with the top of the tower. The nacelle accommodates the generator. Additionally, most parts of the rotor are also accommodated by the nacelle. The hub is mounted rotatable with regard to the nacelle via the main bearing. The rotor blades, which may for instance be two rotor blades, or three rotor blades or even more rotor blades, are attached to the hub. Most commonly built wind turbines are pitched wind turbines, which signifies that each rotor blade is rotatable mounted to the hub via a pitch bearing.

Thus, a plurality of bearings in different size and function can be found in a commonly built wind turbine. These bearings have to support considerable loads. On the one hand, continuous loads, such as the pure mass and weight of the components of the wind turbine or the wind flow hitting the wind turbine are acting on the bearings. Additionally, extreme loads such as induced by gusts act on the bearings. As wind turbines are supposed to operate during decades in often harsh conditions, premature failure of components of the wind turbine is an issue. One premature failure mechanism which is particularly relevant for bearings, is supposed to be caused by brittle flaking or white etching cracks. The failure mechanism is related to the diffusion of atomic hydrogen which diffuses into the components of the wind turbine, for instance parts of the bearing. Subsequently, the hydrogen atoms weaken the material property, particularly the ductility which results in internal local deformation of the microstructure of the material. This may subsequently result in nano-crystalline white etching structures and crack formations.

Embodiments of the present invention include applying a coating to the component of the wind turbine under consideration. The coating is chosen such that it induces a recombination of the atomic hydrogen into hydrogen gas. Consequently, a diffusion of the atomic hydrogen into the component as such is prevented or reduced. In other words, the atomic hydrogen which is potentially damaging and dangerous for the component is prevented to enter, i.e. to diffuse into the component by means of the coating. The coating itself induces the reaction i.e. recombination of the atomic hydrogen to hydrogen gas wherein the latter is not prone to enter or diffuse into the component to such an extent as atomic hydrogen.

Advantageously, the component is covered completely by the coating. However, it may also be sufficient to only cover a part of the surface of the component.

In an advantageous embodiment, the component is in relative motion with regard to a further component of the wind turbine.

The described coating is thus particularly valuable if it is applied to a component where friction takes place. It is particularly relevant for a component where friction takes place on a regular basis. In other words, the coating is particularly advantageous when tribological interactions, which are commonly known as wear, take place. Major types of wear include abrasion, friction, erosion, and corrosion. Although wear is already reduced by the lubricant, during continuous operation of the wind turbine wear is still an issue.

In another advantageous embodiment, the component is in direct contact with the further component.

In another advantageous embodiment, the atomic hydrogen is a product of partial decomposition of the lubricant due to tribological interaction between the component and further component and/or due to electrical currents running through the lubricant.

A part of the tribological interaction, electrical currents running through the lubricant may also contribute to the generation of atomic hydrogen in the lubricant which subsequently may damage the component. Electrical currents in the context of bearings of a wind turbine are particularly relevant in the case of the main bearing. The main bearing basically connects the rotor of the wind turbine with the stator. As both parts have a direct connection to the generator where the electrical current is generated it will in practice be difficult to completely avoid that electrical currents run through the main bearing.

In another advantageous embodiment, the component is a bearing, in particular the main bearing of the wind turbine.

In another advantageous embodiment, the component comprises a rolling element and/or a raceway of the bearing. In principle, a rolling element bearing comprises balls or rollers which aim reducing friction between both bearing components. Rolling elements that are used in rolling element bearings may be cylindrical rollers, tapered rollers, spherical rollers or needles.

A tapered roller bearing has, for instance, the advantage that it can take large axial forces as well as being able to sustain large radial forces. This is beneficial for the use of the bearing as a main bearing in a wind turbine.

In another advantageous embodiment, the component comprises a metal, in particular steel. Steel has the advantage of being readily available and having a high strength.

In another advantageous embodiment, the average thickness of the coating is below 10 micrometers.

An optimum thickness of the coating depends on several factors. One factor is the size of the component. If, for instance, the size of the component is only in the range of millimeters or centimeters, then an average thickness of the coating in the range of nanometers may be sufficient. Another factor which influences the optimum average thickness of the coating is the strength of the wear, i.e. the amount of friction that takes place during operation of the wind turbine. If the component under consideration is prone to considerable wear, then a thicker coating is recommended. The same applies for the amount of electric currents that traverse or goes into the lubricant which also has an influence on the recommended thickness of the coating.

In another advantageous embodiment, the coating comprises a catalyst, in particular a solid catalyst, for inducing the recombination of the atomic hydrogen to hydrogen gas.

As in general with chemical reactions, a desired chemical reaction may be enforced or induced by adding a catalyst. Advantageously, the catalyst is a skeletal catalyst, in particular a skeletal metal catalyst.

In another advantageous embodiment, the coating comprises nickel. In particular, the coating comprises Raney nickel. Raney nickel is a fine-grained solid composed mostly of nickel derived from a nickel-aluminum alloy. A variety of grains are known, but most are gray solids.

Furthermore, an embodiment of the invention relates to a method of reducing diffusion of atomic hydrogen into a component of a wind turbine by using a coating which covers at least partly the surface of the component. The component is in contact with a lubricant, wherein the lubricant comprises atomic hydrogen and the coating is composed such that the combination of the atomic hydrogen to hydrogen gas is induced.

Embodiments of the invention are subsequently shown in more detail by the help of FIG. 1. FIG. 1 shows a preferred configuration and does not limit the scope of the invention.

BRIEF DESCRIPTION

Some of the embodiments will be described in detail, with reference to the following FIGURES, wherein like designations denote like members, wherein:

The FIGURE shows a schematic view of an embodiment of a rolling element bearing with coated components.

DESCRIPTION

The FIGURE shows a rolling element bearing 3 comprising a first bearing element 7 and a second bearing element 8. The rolling element bearing 3 shown in The FIGURE may, for instance, represent a main bearing of a wind turbine. The second bearing element 8 may be static with regard to the nacelle and the tower of the wind turbine, while the first bearing element 7 may be rotatable with regard to the second bearing element 8. In The FIGURE, the raceways 1 of the first bearing element 7 and the second bearing element 8 are depicted, respectively. Both raceways 1 are separated from each other by a gap. The gap is filled with a lubricant 4. Because of degradation of the lubricant 4 atomic hydrogen is generated based on diatomic hydrogen gas.

The atomic hydrogen might have a detrimental effect on the bearing elements 7, 8 as well as the rolling element 2. More specifically, brittle flaking which is also described by white etching cracks may result. In order to prevent or at least mitigate the diffusion of atomic hydrogen into the bearing elements 7, 8 or the rolling element 2, the surface of the respective components are advantageously covered by a coating 5.

In the example of The FIGURE, the raceway 1 of the first bearing element 7, the raceway 1 of the second bearing element 8 and the rolling elements 2 are all covered by the coating 5. Alternatively, it is also possible to only cover one or two out of the raceways 1 of the bearing elements 7, 8 and the rolling elements 2. In an exemplary embodiment, the thickness 6 of the coating 5 amounts up to 5 micrometers.

Although an embodiment of the present invention has been described in detail with reference to the preferred embodiment, it is to be understood that the embodiment of the present invention is not limited by the disclosed example, and that numerous additional modifications and variations could be made thereto by a person skilled in the art without departing from the scope of the embodiment of the invention.

It should furthermore be noted that the use of "a" or "an" throughout this application does not exclude a plurality, and "comprising" does not exclude other steps or elements. Also elements described in association with the embodiment may be combined. It should also be noted that reference signs in the claims should not be construed as limiting the scope of the claims.

The invention claimed is:

1. A component with a coating, wherein the component is a part of a wind turbine, the component is in contact with a lubricant and the lubricant comprises atomic hydrogen, and the coating at least partly covers a surface of the component, wherein the coating reduces diffusion of the atomic hydrogen into the component by a means of inducing a recombination of the atomic hydrogen to hydrogen gas.

2. The component according to claim 1, wherein the component is movable with respect to a further component of the wind turbine.

3. The component according to claim 2, wherein the component is in direct contact with the further component.

4. The component according to claim 2, wherein the atomic hydrogen is a product of partial decomposition of the lubricant due to at least one of a tribological interaction between the component and the further component and electrical currents running through the lubricant.

5. The component according to claim 1, wherein the component is a main bearing of the wind turbine.

6. The component according to claim 5, wherein the component comprises at least one of a rolling element and a raceway of the main bearing.

7. The component according to claim 1, wherein the component comprises steel.

8. The component according to claim 1, wherein an average thickness of the coating is below 10 micrometers.

9. The component according to claim 1, wherein the coating comprises a solid catalyst, for inducing the recombination of the atomic hydrogen to hydrogen gas.

10. The component according to claim 9, wherein the solid catalyst is a skeletal metal catalyst.

11. The component according to claim 1, wherein the coating comprises nickel.

12. A method of reducing diffusion of atomic hydrogen into a component of a wind turbine by using a coating which at least partly covers a surface of the component, wherein the component is in contact with a lubricant comprising atomic hydrogen, and the coating is composed such that recombination of the atomic hydrogen to hydrogen gas is induced.

* * * * *